United States Patent
McAllister et al.

(10) Patent No.: US 9,406,149 B2
(45) Date of Patent: Aug. 2, 2016

(54) SELECTING AND REPRESENTING MULTIPLE COMPRESSION METHODS

(75) Inventors: David Kirk McAllister, Holladay, UT (US); Narayan Kulshrestha, Fremont, CA (US); Steven E. Molnar, Chapel Hill, NC (US)

(73) Assignee: NVIDIA Corporation, Santa Clara, CA (US)

(*) Notice: Subject to any disclaimer, the term of this patent is extended or adjusted under 35 U.S.C. 154(b) by 494 days.

(21) Appl. No.: 12/900,362

(22) Filed: Oct. 7, 2010

(65) Prior Publication Data

US 2011/0243469 A1 Oct. 6, 2011

Related U.S. Application Data

(60) Provisional application No. 61/249,520, filed on Oct. 7, 2009.

(51) Int. Cl.
*G06K 9/36* (2006.01)
*G06T 9/00* (2006.01)

(52) U.S. Cl.
CPC ........................................ *G06T 9/00* (2013.01)

(58) Field of Classification Search
None
See application file for complete search history.

(56) References Cited

U.S. PATENT DOCUMENTS

| | | | |
|---|---|---|---|
| 7,545,382 B1* | 6/2009 | Montrym et al. | 345/530 |
| 2001/0006558 A1* | 7/2001 | Ohta | G06T 7/0004 382/145 |
| 2003/0076998 A1* | 4/2003 | Peters | G06T 9/007 382/238 |
| 2007/0126756 A1* | 6/2007 | Glasco et al. | 345/620 |
| 2008/0144952 A1* | 6/2008 | Chen et al. | 382/239 |

* cited by examiner

*Primary Examiner* — Stephen R Koziol
*Assistant Examiner* — Delomia L Gilliard
(74) *Attorney, Agent, or Firm* — Artegis Law Group, LLP

(57) ABSTRACT

A system and method are described for compressing image data using a combination of compression methods. Compression method combinations are provided to compress image data of a particular frame buffer format and antialiasing mode. Each method in the compression method combination is tried in turn to compress the image data in a tile. The best method that succeeded in compressing the image data is encoded in the compression bit state associated with the tile. Together, the compression bits, the compression method combination, and the frame buffer format provide sufficient information to decompress a tile.

22 Claims, 10 Drawing Sheets

FULL COMPRESSION METHOD COMBINATION TABLE 732

| COMPRESSION METHOD COMBINATION 736 | C32 AND C64 FORMAT 740 | | | | OTHER FORMATS 744 |
|---|---|---|---|---|---|
| | 1x1 | 2x2 | 4x2 | 4x4 | ANY AA |
| 1A | OK | | | | |
| 1B | OK | OK | | | |
| 1C | OK | OK | OK | OK | OK |
| 1R | OK | OK | OK | OK | OK |
| 2AP | OK | | | | |
| 2BA | OK | | | | |
| 2BAP | OK | | | | |
| 2BP | OK | OK | | | |
| 2BR | OK | OK | | | |
| 2BRA | OK | | | | |
| 2BRP | OK | OK | | | |
| 2CA | OK | | | | |
| 2CAP | OK | | | | |
| 2CB | OK | OK | | | |
| 2CBA | OK | | | | |
| 2CBP | OK | OK | | | |
| 2CBR | OK | OK | | | |
| 2CP | OK | OK | OK | OK | OK |
| 2CR | OK | | OK | OK | OK |
| 2CRA | OK | OK | | | |
| 2CRP | OK | OK | OK | OK | OK |
| 2RA | OK | | | | |
| 2RAP | OK | | | | |
| 2RP | OK | OK | OK | OK | OK |
| 3AP | OK | | | | |
| 3BAP | OK | | | | |
| 3BP | OK | OK | | | |
| 3BRAP | OK | | | | |
| 3BRP | OK | OK | | | |
| 3CAP | OK | | | | |
| 3CBAP | OK | | | | |
| 3CBP | OK | OK | | | |
| 3CBRA | OK | | | | |
| 3CBRAP | OK | | | | |
| 3CBRP | OK | OK | | | |
| 3CP | OK | OK | OK | OK | OK |
| 3CRAP | OK | | | | |
| 3CRP | OK | OK | OK | OK | OK |
| 3RAP | OK | | | | |
| 3RP | OK | OK | OK | OK | OK |

SELECTED COMPRESSION METHOD COMBINATION TABLE 644

| | COMPRESSION METHOD COMBINATION 636 | AA MODE 640 | COLOR FORMAT 648 |
|---|---|---|---|
| 0 | 2BRA | 1x1 | C32 |
| 1 | 2C | 1x1 | C32 |
| 2 | 2CBA | 1x1 | C32 |
| 3 | 2CBR | 1x1 | C32 |
| 4 | 2CRA | 1x1 | C32 |
| 5 | 2C | 2x1 | C32 |
| 6 | 2CBR | 2x1 | C32 |
| 7 | 1R | 1x1 | C32 |
| 8 | 1R | 2x2 | C32 |
| 9 | 1R | 4x2 | C32 |
| 10 | 1R | 4x4 | C32 |
| ... | | | |
| 47 | 2CRA | 4x2 | C64 |

CHOOSE COMPRESSION METHOD COMBINATIONS 748

Figure 7

SELECTING AND REPRESENTING MULTIPLE COMPRESSION METHODS

CROSS-REFERENCE TO RELATED APPLICATION(S)

This application claims the benefit of U.S. Provisional Patent Application Ser. No. 61/249,520, filed on Oct. 7, 2009.

BACKGROUND OF THE INVENTION

1. Field of the Invention

The present invention generally relates to graphics processing and more specifically to compression of image data.

2. Description of the Related Art

Conventional graphics processors use compression to reduce the memory footprint of color data stored in the frame buffer and/or to reduce the bandwidth needed to access the color data stored in the frame buffer. Some forms of compression operate on tiles that include color data for several pixels. With several possible color and Z compression possibilities available for compressing tiles, it is problematic how to represent these possibilities using the least amount of information so that decompression behaves correctly.

Accordingly, what is needed in the art is a system and method for representing the compression possibilities using the least amount of information.

SUMMARY OF THE INVENTION

A system and method for using compression method combinations and frame buffer formats to compress image data is presented. In particular, image data in a tile is compressed using a particular compression method combination and frame buffer format. Each method in the compression method combination is tried in turn to compress the image data in the tile using the frame buffer format. Each method in the compression method combination is mapped to one or more compression bit states, expressed as one or more bits. The method that succeeded in compressing the image data in the tile is encoded using the compression bit state associated with that method. The compression method combination and frame buffer format are also encoded in the page table entry associated with a physical page in the frame buffer. Together the compression bits, the compression method combination, and the frame buffer format indicates how to decompress a tile.

Various embodiments of a method of the invention for using compression method combinations and frame buffer format to compress image data comprises the steps: receiving the image data for a tile, a compression method combination, and a frame buffer format; applying the compression method combination to the image data using the frame buffer format and associating a specific method of the compression method combination with the image data if compression was successful (including uncompressed data); and writing the compressed image data for the tile.

Various embodiments of the invention include a system for using compression method combinations and frame buffer formats to compress image data. The system includes a processor that is configured to receive the image data for a tile, a compression method combination, and a frame buffer format. The system applies the compression method combination to the image data using the frame buffer format. If the compression was successful then the system associates a specific method of the compression method combination with the image data. If no method succeeds in compressing the image data, then the image data remains uncompressed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7 shows, in one embodiment, the full compression method combination table, according to one embodiment of the present invention;

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
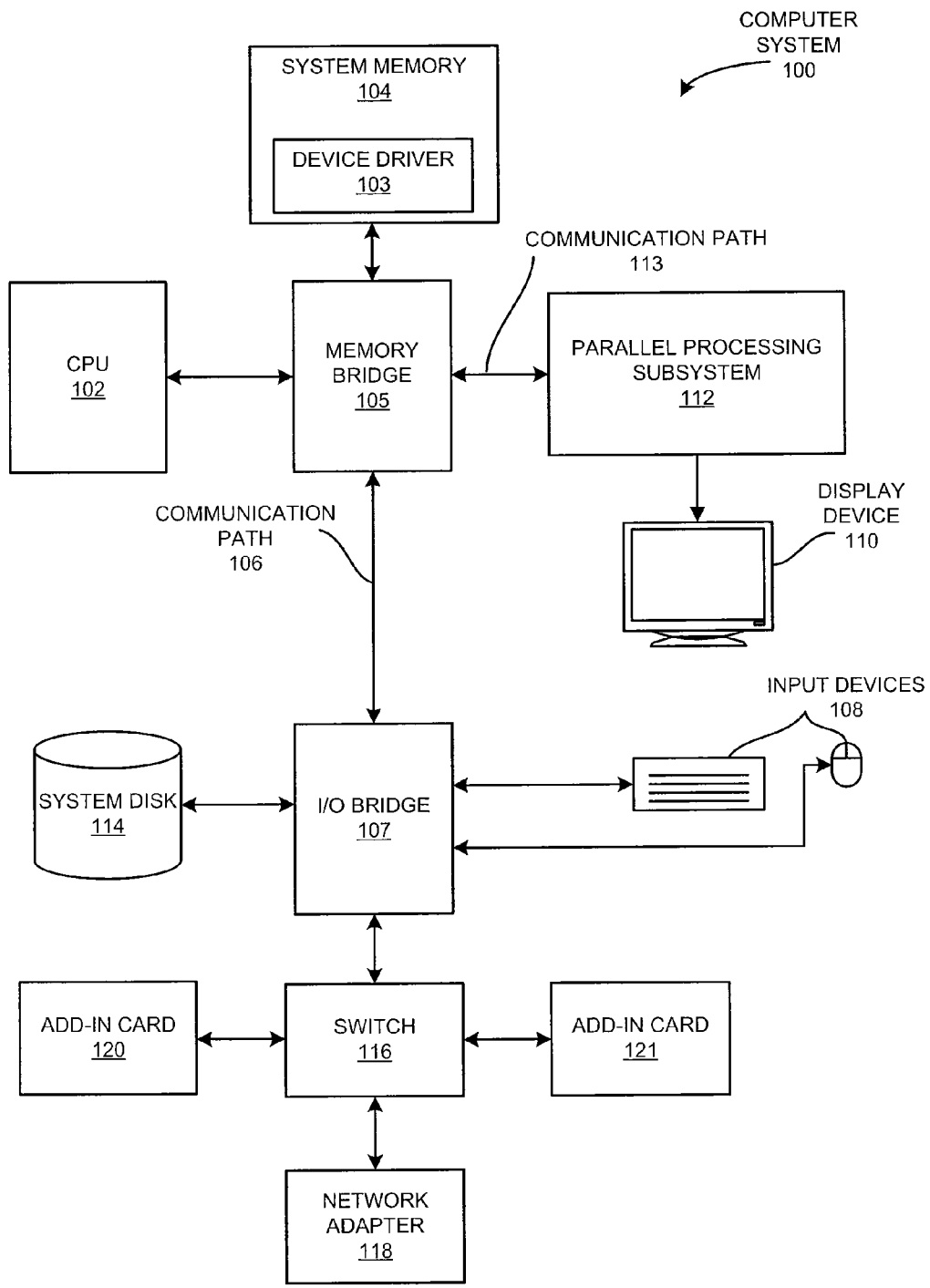
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
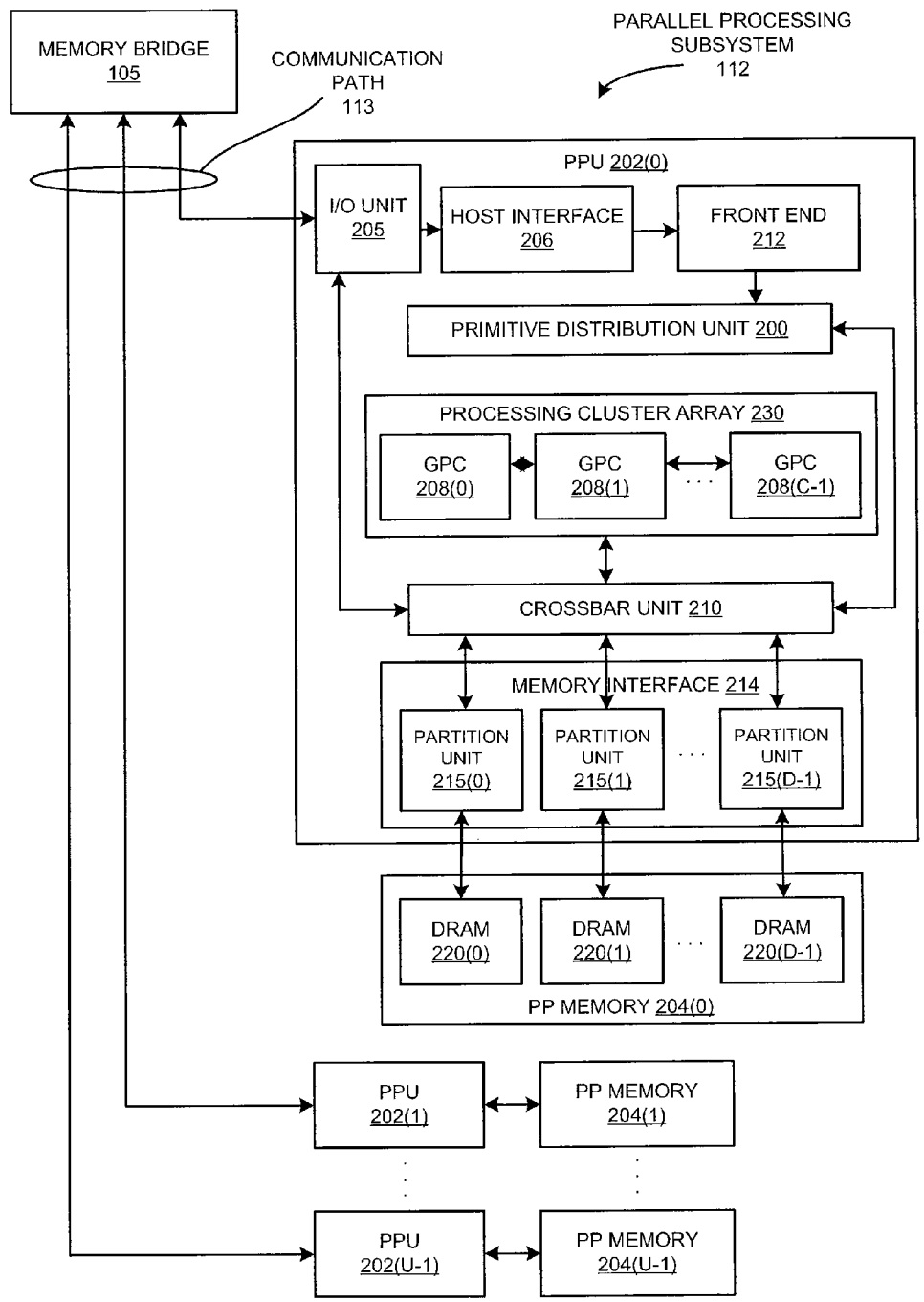
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a primitive distribution unit 200, which receives commands defining processing tasks from front end unit 212. Processing tasks include indices of data to be processed, e.g., surface (patch) data, primitive data, as well as state parameters and commands defining how the data is to be processed (e.g., what program is to be executed). Primitive distribution unit 200 may be configured to fetch the indices corresponding to the data, or primitive distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A primitive distribution unit 200 may be configured to produce tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen-space to produce a rendered image. Intermediate data produced by GPCs 208, such vertex attributes, may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
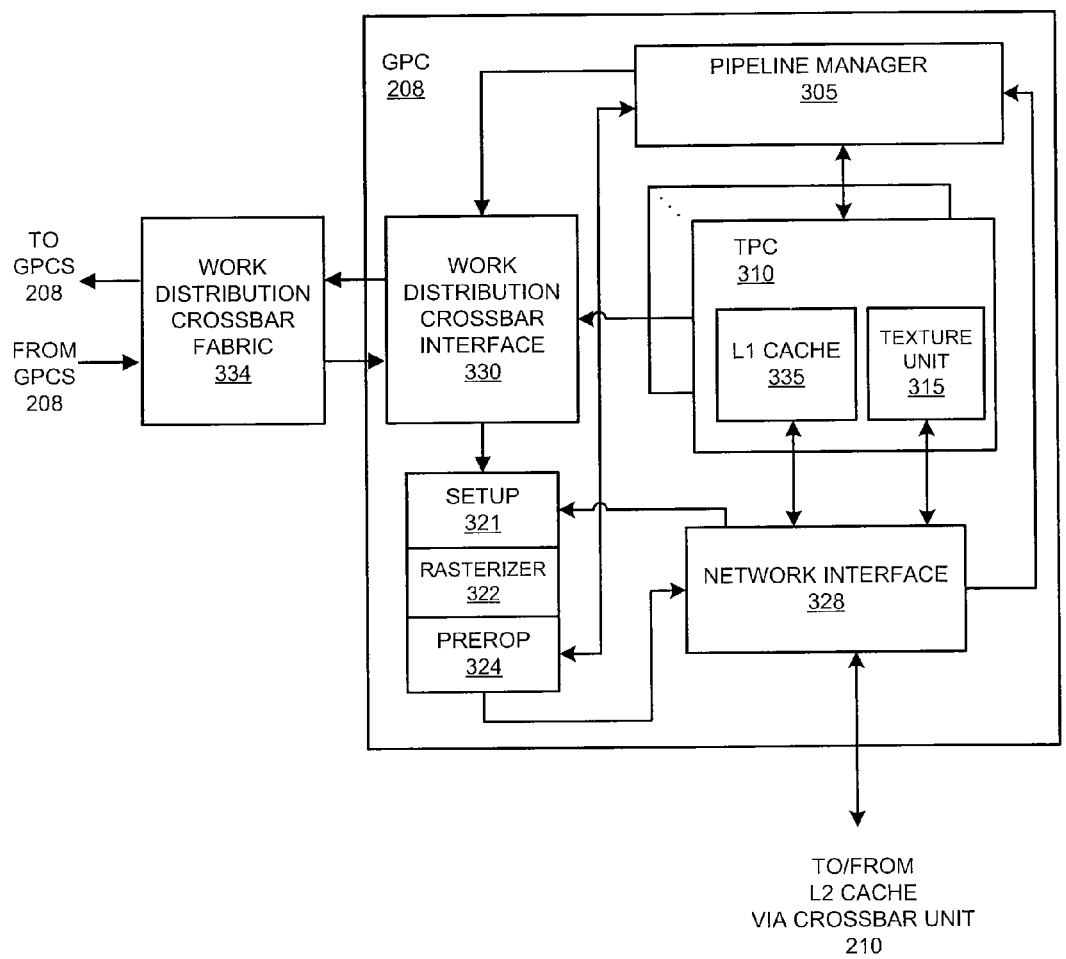
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

The primitive distribution unit 200 distributes processing tasks to each TPC 310 within the GPCs 208 via crossbar unit 210. In particular the primitive distribution unit 200 distributes primitives for object-space (geometry) processing by the TPCs 310. A pipeline manager 305 within each GPC 208 distributes the object-space processing tasks to streaming multiprocessors within each of the TPCs 310. Pipeline manager 305 may also be configured to control a work distribution crossbar interface 330 to distribute state parameters and commands to the TPCs 310 for object-space processing and screen-space processing.

In one embodiment, each GPC 208 includes a number M of TPCs 310, where M≥1, each TPC 310 configured to process one or more thread groups. Also, each TPC 310 advantageously includes an identical set of functional execution units (e.g., arithmetic logic units, and load-store units, and the like) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an TPC 310 is referred to herein as a "warp" or "thread group." As used herein, a "thread group" refers to a group of threads concurrently executing the same program on different input data, with one thread of the group being assigned to a different processing engine within a TPC 310. A thread group may include fewer threads than the number of processing engines within the TPC 310, in which case some processing engines will be idle during cycles when that thread group is being processed. A thread group may also include more threads than the number of processing engines within the TPC 310, in which case processing will take place over multiple clock cycles. Since each TPC 310 can support up to G thread groups concurrently, it follows that up to G*M thread groups can be executing in GPC 208 at any given time.

Additionally, a plurality of related thread groups may be active (in different phases of execution) at the same time within a TPC 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the TPC 310, and m is the number of thread groups simultaneously active within the TPC 310. The size of a CTA is generally determined by the programmer and the amount of hardware resources, such as memory or registers, available to the CTA.

Each TPC 310 contains an L1 cache 335 or uses space in a corresponding L1 cache outside of the TPC 310 that is used to perform load and store operations. Each TPC 310 also has access to L2 caches within the partition units 215 that are shared among all GPCs 208 and may be used to transfer data produced during object-space primitive processing to TPCs 310 to perform screen-space primitive processing. Finally, TPCs 310 also have access to off-chip "global" memory, which can include, e.g., parallel processing memory 204 and/or system memory 104. It is to be understood that any memory external to PPU 202 may be used as global memory. Additionally, an L1.5 cache may be included within the GPC 208, configured to receive and hold data fetched from memory via memory interface 214 requested by TPC 310, including instructions, uniform data, and constant data, and provide the requested data to TPC 310. Embodiments having multiple TPCs 310 in GPC 208 beneficially share common instructions and data cached in an L1.5 cache.

Each GPC 208 includes a network interface 328 that may be configured to map virtual addresses into physical addresses. In other embodiments, the mapping of virtual addresses into physical addresses may be performed within the memory interface 214. A set of page table entries (PTEs) is used to map a virtual address to a physical address of a tile and optionally a cache line index. Address translation lookaside buffers (TLB) or caches which may reside within a TPC 310 or the L1 cache 335 or GPC 208. The physical address is processed to distribute render target data access locality to allow efficient request interleaving among partition units. The cache line index may be used to determine whether or not a request for a cache line is a hit or miss.

A GPC 208 may be configured such that each TPC 310 includes a texture unit 315 for performing texture mapping operations, e.g., determining texture sample positions, reading texture data, and filtering the texture data. Texture data is read from a texture L1 cache or in some embodiments from the L1 cache 335 within TPC 310 and is fetched from an L2 cache, parallel processing memory 204, or system memory 104, as needed.

As previously explained, TPCs 310 receive batches of primitives and perform object-space processing. Each TPC 310 outputs a stream of object-space processed primitive descriptors to the work distribution crossbar interface 330 in order to redistribute the object-space processed primitive descriptors via the work distribution crossbar fabric 334 to one or more GPCs 208 for screen-space processing. A primitive descriptor includes the primitive type (triangle strip, triangle mesh, line, and the like), flags, and indices of vertices. The object-space processing includes one or more of vertex shading, tessellation shading, and geometry shading. The screen-space processing is rasterization of the primitives, and may include one or more of scan conversion, shading, depth/stencil operations, and blending. TPC 310 may also output the object-space processed primitive data, i.e., vertex attributes, for storage in an L2 cache, parallel processing memory 204, or system memory 104 via crossbar unit 210.

A preROP (pre-raster operations) 324 is configured to receive data (screen-space processed primitives) from TPC 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., TPCs 310, setup units 321, rasterizers 322, or preROPs 324 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
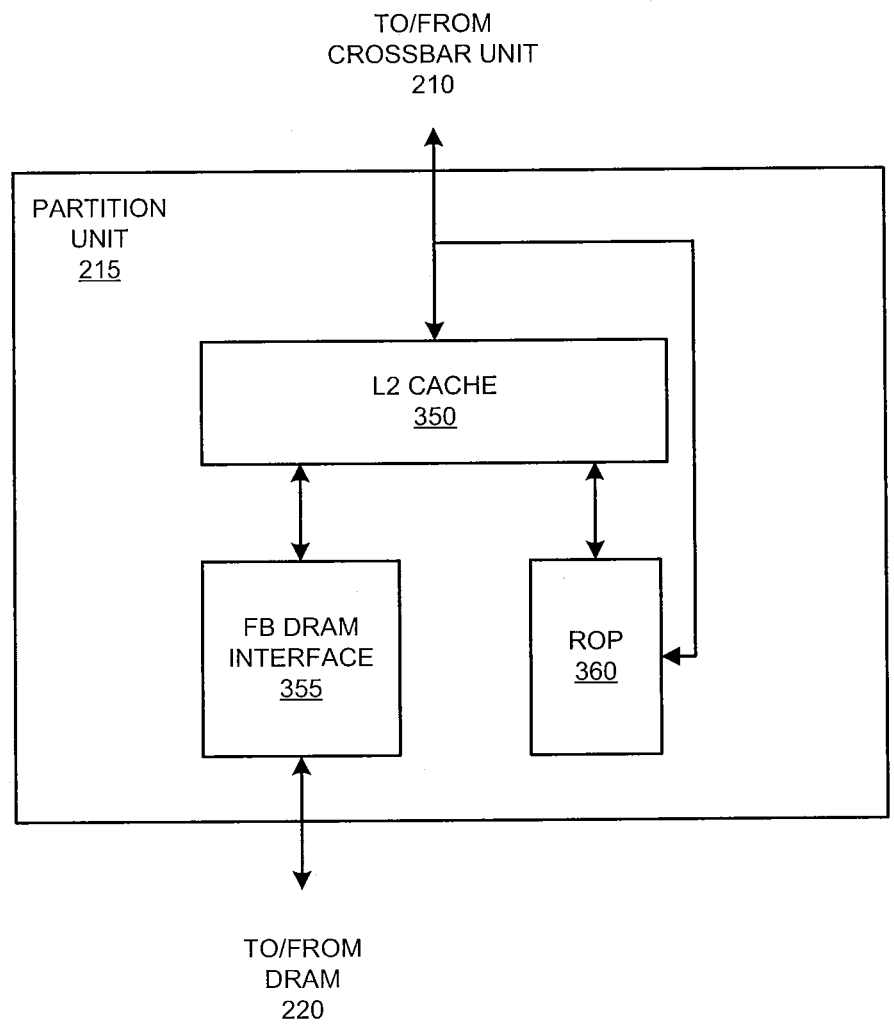
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. Each partition unit 215 includes a ROP 360 in order to distribute processing of the raster operations. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. ROP 360 receives color and z fragment data from the GPCs 208 and may be configured to compress z or color data that is written to memory and decompress z or color data that is read from memory. In some embodiments of the present invention, ROP 360 is included within each GPC 208 instead of partition unit 215, and pixel read and write requests are transmitted over crossbar unit 210 instead of pixel fragment data.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Graphics Pipeline Architecture

Figure 4:
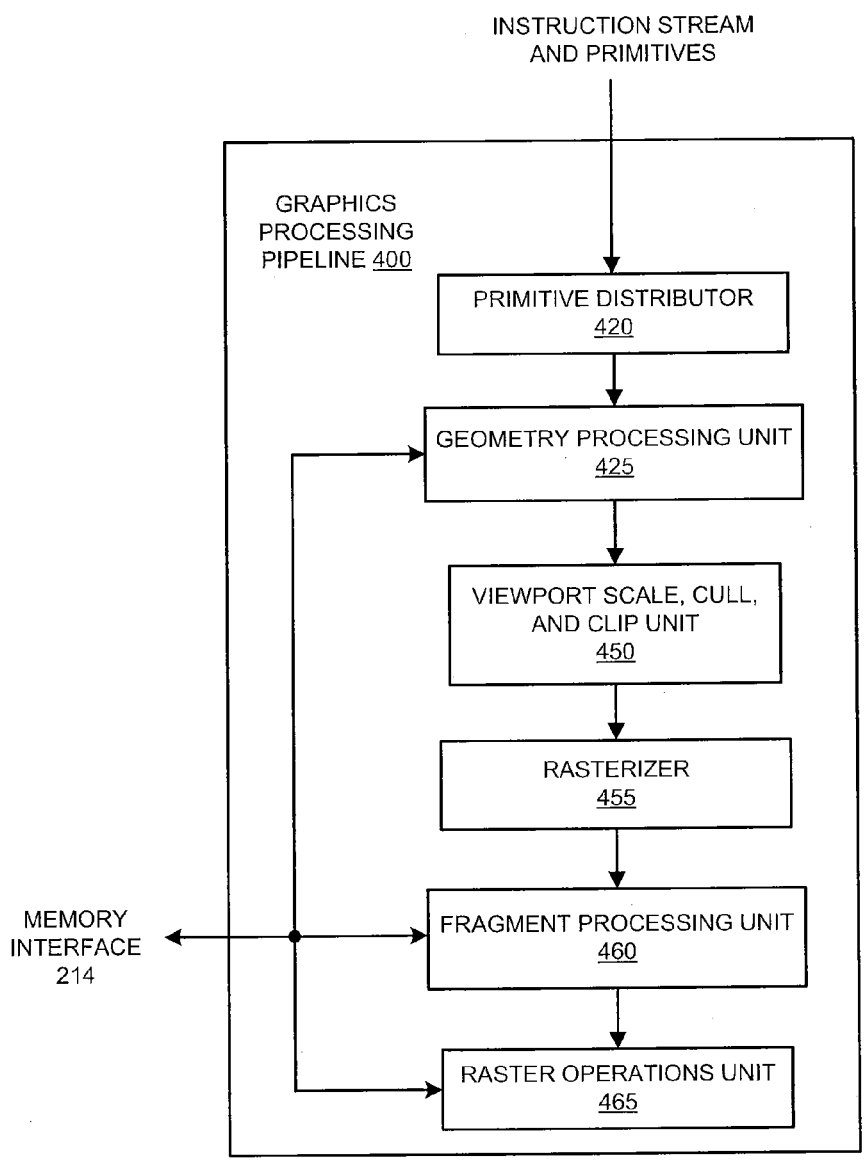
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the TPCs 310 may be configured to perform the functions of one or more of a geometry processing unit 425, and a fragment processing unit 460. The functions of primitive distributer 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Vertex data for high-order surfaces, primitives, and the like may be stored in in L1 cache 335, parallel processing memory 204, or system memory 104 and accessed as needed to render the primitives. The functions of the primitive distributer 420 may be performed by the primitive distribution unit 200. Primitive distributer 420 receives pointers to primitive index lists stored in memory. The entries in these index lists point into lists of vertex attributes (vertex buffers), also stored in memory. Because primitives are stored compactly and many primitives can be passed to the primitive distributer 420 in a single draw call, indexed primitive lists and vertex buffers are the most efficient way to convey geometry to the graphics pipeline 400. The front end 212 may be configured to store legacy inline and immediate mode vertices in vertex buffers, so the primitive assembler 420 only has to deal with this one, efficient type of primitive input data, namely primitive index lists. In other embodiments the primitive distributer 420 may receive the vertex data instead of pointers to primitive index lists.

In some embodiments, the GPCs 208 are configured to perform tessellation processing prior to geometry processing. In those embodiments the primitive distributer 420 distributes batches of primitives for tessellation processing to multiple TPCs 310 and streams of tessellated primitive batches are produced.

Primitive distributer 420 dices the index list into self-contained batches of indices specifying up to J vertices and K primitives, such that each vertex in a strip, after the first two, specifies a new triangle. In some embodiments, J is 32, K is 30, and batches may occupy from one to four 32B data packets, depending on the number and type of primitive and contain the following information: indices of vertices in the vertex buffer and topology information (which vertices in the batch comprise each primitive). Importantly, the primitive distributer 420 works entirely with primitive indices—it does not touch the vertex data itself. The vertex data is later fetched by the TPC 310 assigned for vertex shading.

Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory.

The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Encoding Compression Formats

The color data that is written to memory may be compressed without loss in order to reduce the bandwidth needed to read and write the frame buffer. The ROP 360 of FIG. 3 may be configured to compress ROP tiles using various compression methods, including zero-bandwidth clears, full reduction, arithmetic compression, both full reduction and arithmetic compression, and partial coverage layers in conjunction with the other compression methods. Further, the ROP 360 may also be configured to decompress ROP tiles stored in the frame buffer. Decompressing a ROP tile involves first determining what compression method was used to compress the tile and then decompressing the compressed data.

Surfaces are portions of the frame buffer memory used to store images. In particular, surfaces may consist of multiple pages and each page may be organized as ROP tiles. A ROP tile, in one embodiment, may occupy 256 bytes and may be sized as 32 bytes×8 lines. The ROP tile may be divided into eight sub packets. A sub packet may consist of 32 bytes and may be sized as 16 bytes×2 lines. A sub packet is what ROP 360 can read or write as an atomic unit to memory in a single clock cycle. The goal of compression is to write or read as few sub packets as possible to memory, thus realizing the aforementioned savings on bandwidth. In particular, ROP 360 can write up to eight sub packets—which constitute a single tile—or as few as zero sub packets—which would occur in the case of the zero-bandwidth clear compression method.

Figure 5:
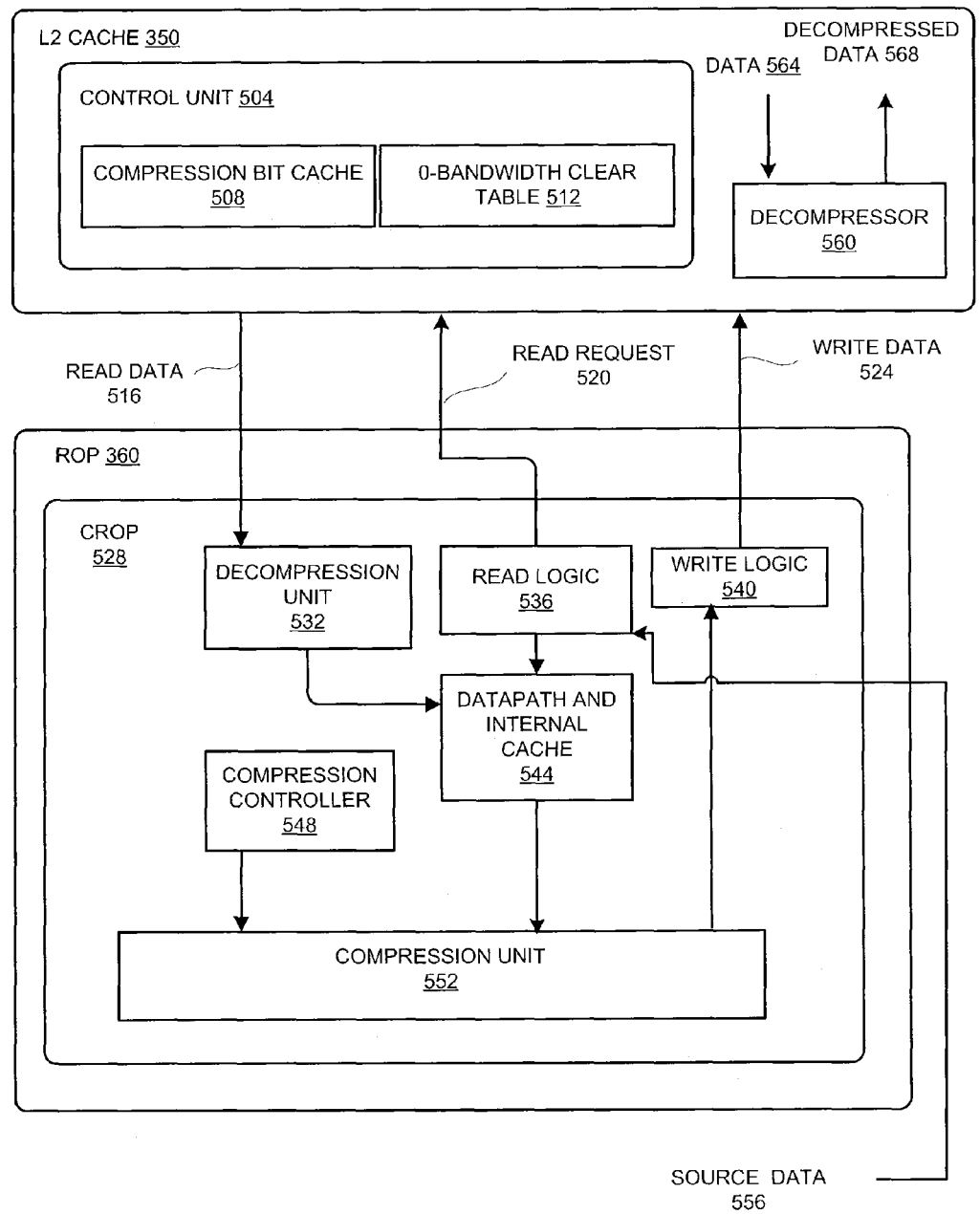
FIG. 5 is a block diagram of a portion of the raster operations unit and the L2 cache of FIG. 3B, according to one embodiment of the present invention.

FIG. 5 is a block diagram of a portion of the ROP 360 and the L2 cache 350 of FIG. 3B, according to one embodiment of the present invention. The ROP 360 includes a color raster operations unit (CROP) 528, and the CROP 528 includes a decompression unit 532, read logic 536, write logic 540, a compression controller 548, a data path and internal cache 544, and a compression unit 552. In operation, the CROP 528 performs color raster operations, including compression of color data written to and decompression of destination color data read from the L2 cache 350. The L2 cache 350 includes a control unit 504 that stores the compression bits of one or more tiles in a compression bit cache 508 and clear values in a zero-bandwidth clear table 512. The compression bits are associated with each tile in the L2 cache 350. In one embodiment, a cache line of the compression bit cache contains the compression bits for all tiles residing on a memory page in the L2 cache; thus, there is a separate cache line in the compression bit cache for each memory page in the L2 cache. During decompression, the CROP 528 determines what compression method was used by examining the compression bits associated with the particular tile. To support decompression, the CROP 528 may include separate logic units for each different compression method, or some combination. In some embodiments, certain "naïve" cache clients may not be equipped to receive tiles that are compressed. In such embodiments, the L2 cache 350 may include a decompressor 560, which decompresses data for naïve clients that requested it. Data 564 is passed to decompressor 560 for such clients, decompressed, and decompressed data 568 is returned to said clients. It should be recognized that uncompressed data 564 may pass straight through the decompressor 560 unmodified. Similarly, compressed data 564 for clients with their own decompressor 560 passes through the decompressor 560 unmodified. Read data to other clients either is output directly from the data cache (not shown), or it is read from the data cache, passes through the decompressor 560, and then is output from the L2 cache 350. The decompressor 560 may be used when the data is compressed or the client is a naïve client.

When performing color raster operations, source data 556, including sample color data and coverage information, is received by read logic 536 and, if needed, read data 516 (destination data) is read from the L2 cache 350 according to a read request 520. Source and/or destination data is processed by and stored in the data path and internal cache 544. The decompression unit 532 decompresses data when required by using the pre-determined compression method combination and frame buffer format encoded with the associated frame buffer page together with the compression bits from the compression bit cache 508. In the absence of blending, the data path and internal cache 544 simply stores the source data 556.

The combined source and destination data or source data is output by the data path and internal cache 544 to the compression unit. The compression unit 552 compresses the tile based on the compression method combination and frame buffer format and outputs a tile consisting of sub packets. The compression unit 552 transmits both the compression bits and the sub packets of the compressed tile to the write logic 540 and thence as write data 524 to the L2 cache unit 350 for storage. Note that write data 524 may include tiles encoded in a compressed or uncompressed format, depending on what compression method was used (which includes an uncompressed format) together with the compression bits.

A cache line of the compression bit cache 508 includes all the compression bits associated with all the tiles on a single frame buffer page. When any portion of the frame buffer page is read into the L2 cache 350, the compression bits associated with the tiles on the page are stored in the compression bit cache 508. These bits tell the decompression unit 532 which method was used to compress the tile and, therefore, how to decompress the tile.

Compressing a tile involves receiving the tile in question and the compression method combination and frame buffer format appropriate for the frame buffer page of which the tile is a part, applying each method in the compression method combination using the frame buffer format until at least one method succeeds in compressing the tile, determining the bit encoding corresponding to the successful method, associating the bit encoding with the tile, and writing the compressed tile back to the L2 cache. Ultimately, the compressed tile (and its associated compression bits) and all the other compressed tiles on a memory page in the L2 cache will be written back to the frame buffer. In one embodiment, all tiles on a page are compressed using the same compression method combination and frame buffer format, but not necessarily the same method. That is, for example, tile 1 may be compressed using full reduction compression and tile 2 on the same page may be compressed using arithmetic compression. In order to decompress a particular tile, the compression bits associated with the tile, the method combination, and the frame buffer format are retrieved. The method combination is a portion of the PTE kind, where PTE stands for Page Table Entry, and the PTE kind is applicable to all the tiles comprising the page. The compression method combination is further described below. The frame buffer format such as 2×2 or 4×AA is also a portion of the PTE kind. The method combination and the frame buffer format may be combined and encoded in the PTE kind.

Figure 6:
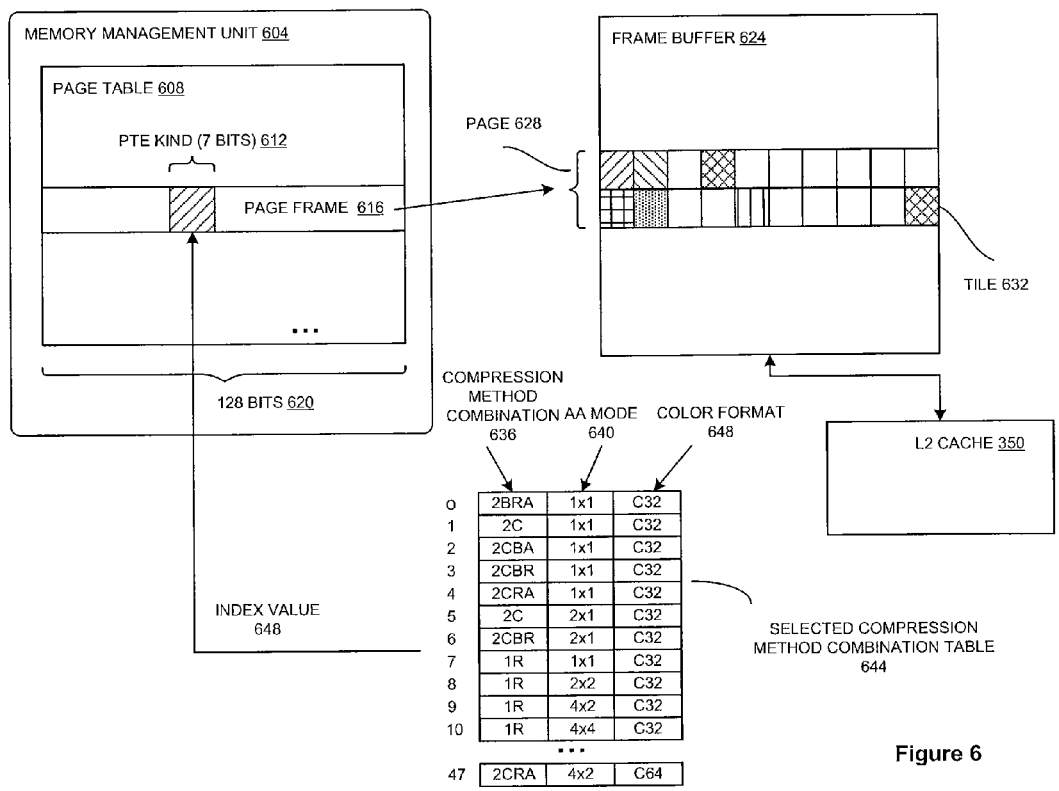
FIG. 6 illustrates a page table that maps virtual memory pages into physical pages residing in the frame buffer where each entry in the page table includes the PTE kind, according to one embodiment of the present invention.

FIG. 6 illustrates a page table that maps virtual memory pages into physical pages residing in the frame buffer where each entry in the page table includes the PTE kind, in accordance with one embodiment of the present invention. More specifically, the figure shows a memory management unit (MMU) 604, which may reside in network interface 328. In page table 608, one entry in the page table is highlighted to show that a virtual memory page maps into the physical page indicated by the physical address stored in the page frame 616. The physical address refers to page 628 in the frame buffer 624. In one embodiment, since a page 628 may be of size 64 KB and a tile may be of size 256 B, a page may consist of many tiles. As described above, a compression method combination and frame buffer format applies to the entire page 628; this combination and format are encoded in the PTE kind 612 of the page table entry in page table 608 and are determined at the time the page is allocated. In one embodiment, the PTE kind may comprise 7 bits in a page table entry that may itself comprise 128 bits. Tile 632 in FIG. 6 indicates a single tile in page 628. The crosshatching in Tile 632 and the other tiles in page 628 is meant to indicate that each tile was compressed using a different compression method that was also part of the same method combination.

The selected compression method combination table 644 represents a carefully chosen set of method combinations that are useful for compressing image data. Though it would be possible to encode all possible combinations of compression methods to compress tiles, the bits allocated for the PTE kind may not be sufficient to represent all possible combinations. Usefulness is determined by applying a set of rules and constraints on the combinations. For example, in one embodiment, both full reduction and arithmetic compression makes sense under 4×AA, typically 4:1 compression. When greater than 4×AA compression is used, the reduced representation has too small a footprint to permit arithmetic compression. When less than 4×AA compression is used, if full reduction compression is not applied, then it is difficult to know how to perform arithmetic compression on such data. As another example, arithmetic compression is allowed in all anti-aliasing modes because full reduction may fail, but arithmetic compression can still provide 2:1 compression. Thus, the selected compression method combination table 644 shows only the valid combinations.

The left side of table 644 lists compression method combination 636 names that indicate 48 valid compression method combinations used in one embodiment. There are five full compression methods: zero-bandwidth clears (C), full reduction and arithmetic compression (B), full reduction (R), arithmetic compression (A), and partial coverage layers (P). These five compression methods may be combined into different sequences such as 1A, 2BA, 2BRP, 3BAP, and 3RAP. The right side of the table shows the AA Mode 640 (anti-aliasing), which indicates the number of samples per pixel (the amount of compression that may be obtained) and the format of each sample—that is appropriate for the corresponding method. The right side also shows the color format to be used, which may be C32 (32-bit color format) or C64 (64-bit color format).

An example of a compression method combination is 1A. 1A means that one bit is needed to indicate 2 possible compression bit states: bit state 0 (encoded as a bit 0) indicates no compression; bit state 1 (encoded as bit 1) indicates arithmetic compression (A) may be used. The corresponding entry "1×1" indicates that one sample per pixel is used to store the color of the pixel for each pixel in the tile (frame buffer format). In one embodiment, to indicate this method combination for encoding in the PTE kind associated with a page table entry, an index value (648) may be associated with that method combination and frame buffer format. For example, index value 0 indicates method combination 1A and its corresponding frame buffer format, that is, color format A8 R8 G8 B8 and AA (anti-aliasing) format 1×1. This index value of 0 was encoded in the PTE kind 612 in the page table 608 corresponding to the page 628 of which this tile is a part at the time the page 628 was allocated with the surface. Again, it should be recognized that all the tiles need to be compressed using method combination 1A before the page 628 is stored in the frame buffer 624. If this is a new page in the frame buffer 624, then a new page table entry is allocated in the page table 608, page frame 616 is updated to contain the address of page 628 in the frame buffer, and the 7 bits of the PTE kind 612 are encoded with the index value 0. This tile was compressed using arithmetic compression and has compression bits associated with it. Thus, when this tile is later decompressed, the associated compression bits (1) and the PTE kind (index value 0) are sufficient to perform the decompression. The PTE kind where the index value is 0 indicates method combination 1A and color format C32 and AA (anti-aliasing) mode 1×1, and so the ROP 360 knows the method combination is arithmetic and from the compression bits that the value is 1; the ROP 360 further knows that in fact this tile was compressed using arithmetic compression and color format C32 and AA mode 1×1. If the compression bit had been 0, that would have indicated that no compression was used, that is, the tile stored in uncompressed form and, therefore, all sub packets would need to be read.

As another example, method 2CRA at index value 47 in the selected compression method combination table 644 means that two bits are necessary to encode the particular compression method used for a tile, and that three full compression methods may be used—C means zero-bandwidth clear, R means full reduction, and A means arithmetic compression. It should be recognized that a full compression method may appear by itself only once in the sequence of method combinations; when partial coverage layers are used, the P method may be paired with one full compression method.

FIG. 7 depicts the full compression method combination table in accordance with one embodiment of the present invention. In this table, "OK" indicates that the compression method combination 736 in conjunction with C32/C64 color format 740 and other formats 744 is a valid combination. Recall that C32 refers to 32-bit color format and C64 refers to 64-bit color format. In one embodiment, this full compression method combination table 732 was constructed by applying a set of rules to the full cross product of possible frame buffer formats, AA format (anti-aliasing), and compression method combinations. As described above, all these method combinations indicated by OK could potentially be defined as PTE kinds. To keep the PTE kind field as short as possible (fewest number of bits), only a subset of these entries is selected to be defined on the chip itself. This subset can be indexed by a 7-bit PTE kind value, thus saving bits as compared to separately encoding the frame buffer format, MSAA format, and compression method combination. That derivation of the subset of method combinations from the full compression method combination table 732—choose compression method combinations 748—results in the selected compression method combination table 644 that was seen earlier. It should be recognized that table 644 represents one of many possible combinations of compression methods and the frame buffer formats from the full compression method combination table 732 and should not be construed as limiting the scope of the present invention. A chip designer may select the compression method combinations and frame buffer formats that are valid for a particular chip design. The selections may potentially differ from chip design to chip design. Once determined, the selected compression method combination table 644 is stored on the chip itself, according to one embodiment.

Figure 8:
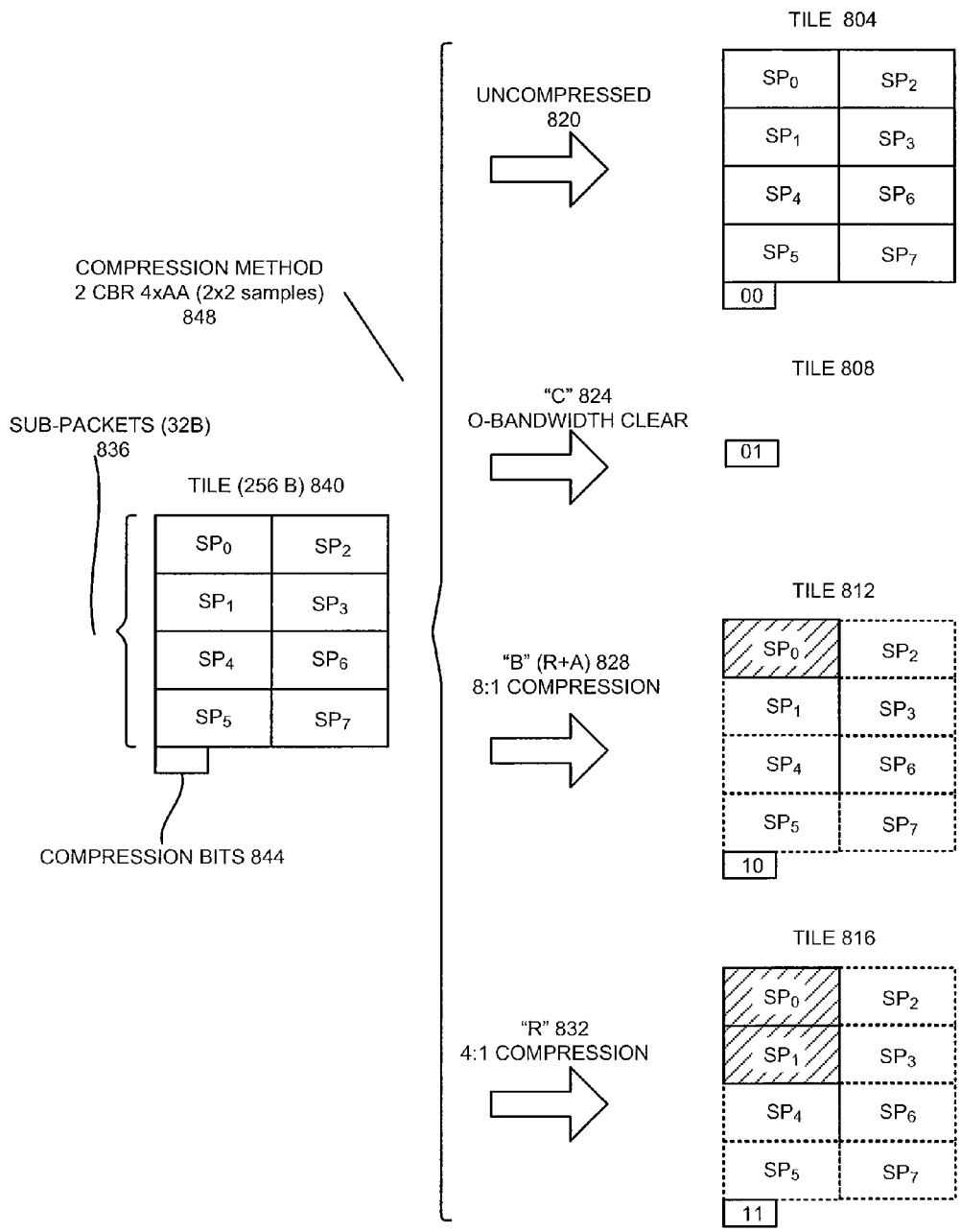
FIG. 8 illustrates applying a particular compression method combination and frame buffer format to a tile, according to one embodiment of the present invention.

FIG. 8 illustrates an example of applying a particular compression method combination and frame buffer format to a tile in accordance with one embodiment of the present invention. In particular, tile 840 consists of eight sub packets 836, each labeled $SP_0$ through $SP_7$. The compression bits 844 are associated with the tile itself and encode the method that was used to successfully compress tile 840. For illustrative purposes, compression method combination 2CBR (2×2 samples, or 4×AA or 4:1 frame buffer format) 848 is used. The number "2" in 2CBR indicates that two bits will be used to encode the actual method used to compress tile 840. The correspondence between the method and the two bits is shown in the following table in accordance with one embodiment of the present invention:

TABLE 1

2CBR method combination and associated bits

| Method name | Compress bit state |
|---|---|
| Uncompressed | 00 |
| C zero-bandwidth clear | 01 |
| B (8:1) compression | 10 |
| R (4:1) compression | 11 |

In Table 1, compress bit state 00 indicates that the tile is uncompressed. Method C zero-bandwidth clear is associated with compress bit state 01. Method B (full reduction compression and arithmetic compression) is associated with compress bit state 10. Finally, method R (full reduction compression) is associated with compress bit state 11. Each compression method is tried in turn sequentially to compress the tile; the first method that succeeds is chosen. Order matters with respect to the bit states. That is, CBR means that compression method C (zero-bandwidth clear) is attempted first, method B (8:1 compression) is attempted next, and finally, method R (4:1 compression) is attempted. Referring back to FIG. 8, method uncompressed 820 shows a tile 804 that results from doing no compression at all; all the sub packets remain the same but bits 00 are encoded in the associated compression bits to indicate the uncompressed state. Next, the C 824 or zero-bandwidth clear compression method, when applied to tile 840, results in a tile (with no sub packets at all) that has associated compression bits encoded with bits 01. Zero-bandwidth clear indicates that the tile is all the same color; the actual colors are stored in the zero-bandwidth clear table 512 in the L2 cache 350. It should be recognized that because there is no need to do any memory reads or writes, bandwidth may be saved. Next, method B (R+A) 828 is actually two compression methods applied sequentially. That is, R or full reduction compression, is applied to tile 840, which given 4×AA frame buffer format results in a tile of 2 sub packets. This is then followed by A or arithmetic compression, which is applied to the output of the R compression method. Given 4×AA frame buffer format, the output is one sub packet, namely $SP_0$, which is shown crosshatched. The resulting tile, in one embodiment, may contain all the sub packets, but only $SP_0$ contains real information while the other sub packets are garbage. Associated with the resulting tile are the compression bits encoded with 10 (bit state 2). Next, the R 832 compression method alone is full reduction compression, and when applied to tile 840, given the 4×AA compression ratio, results in two sub packets, namely $SP_0$ and $SP_1$ which is indicated by crosshatching those sub packets in the figure. The other sub packets contain garbage. Associated with the resulting tile after compression are the compression bits 11 (bit state 3).

In general, each compression method combination is constructed so that when read from left to right each successive compression bit state is associated with each method. Every compression method is assumed to have an uncompressed state, indicated by state 0 so that the uncompressed state need not be represented in the compression method combination. For example, 3CBRA indicates that 3 bits are needed to encode the compression methods CBRA. Each successive compression bit state is assigned to CBRA from left to right. To with, method C is assigned state 001. Method B (full reduction plus arithmetic compression) is assigned state 010. Method R (full reduction) is assigned bit state 011. Method A (arithmetic compression) is assigned state 4 100. It is important to know this ordering in the method compression combination name when decompression is applied to a tile. Given a tile to be decompressed, the PTE kind is read to indicate the method combination, the frame buffer format, and the associated compression state bits are read to indicate which method and which format in the combination was actually used to compressed the tile; the corresponding decompressor logic will be used to decompress a tile. Thus, if PTE kind is 2BRA 1×1 and compression state bits for the given tile are 10, it can be determined that the actual compression method used was R (full reduction). In one embodiment, the decompressor logic for R may reside in either the ROP 360 or the L2 cache 350, or both. Similarly, there may be separate decompressor logic for compression methods A, C, B, and P. Compression method B may be regarded as a hybrid-compression method because it is typically compression method R followed by compression method A. In other embodiments, the decompressor logic for these compression methods may be combined in different ways.

Additional embodiments of the invention employ partial coverage layers. In particular, when a partial coverage layer is added on top of a full coverage layer, which is expressed by the compression methods C, B, R, and A, the number of sub packets that are needed when a full coverage compression method is paired with a partial coverage layer needs to be determined. Further, this pairing needs to be expressed by the compression bits associated with the tile. As described previously, the number of sub packets needed for the full coverage layer varies according to the manner in which it is compressed (including the frame buffer format like 4:1 or 4×AA) as illustrated in FIG. 8. The frame buffer format is sufficient to indicate the number of sub packets that would result from the compression method. For example, in the compression method 2BRP 4×AA, if the full coverage layer was compressed with B (full reduction plus arithmetic compression), the result is one sub packet. If compressed with R (full reduction), the result is two sub packets. Thus, compression bit state 00 is B (one sub packet), state 01 is R (two sub packets). However, state 10 may refer to BP (combination of B and P), which results in three sub packets, or to RP (combination of R and P), which results in four sub packets. A technique for allocating the remaining bits of the compression bits associated with a tile in a meaningful way to accommodate partial coverage layers is described below.

In one embodiment, different compression bit states are allocated for each different full coverage plus partial coverage layer case. For example, in 3BRP, the states starting with 001 correspond to the following: B (001), R (010), BP (011), RP (100), BPP (101), RPP (110), and BPPP (111). The first state 000 (zero) is always reserved for uncompressed.

In another embodiment, the compression bit states are mapped directly to the number of sub packets in the resulting tile and an in-band flag is used to determine the format. With the in-band flag, compression bit states are mapped to the number of sub packets. The smallest full coverage representation allowed by the PTE kind is state 0. The compression bit state value equals the number of sub packets beyond this that must be read. For example, if the format is 3CBP, the smallest full representation is C, which takes zero sub packets. State 011 indicates that 0+3 sub packets must be read. Likewise, if the format were 2BAP, in 1×AA compression ratio, B requires two sub packets. So a state of 010 would mean 2+2 or four sub packets. The format of those sub packets, once they are read, is indicated by the flag value in sub packet 0. The flag itself is implemented by first reserving a bit field in sub packet 0 that for all full coverage representations indicates its representation. The following is an example using an 8-bit flag:

TABLE 2

In-band flag for partial coverage layers

| Flag Value | Representation of First Layer |
| --- | --- |
| 0xf0 | B |
| 0xf1 | A |
| 0xf2 | P |
| Anything else | R |

Since there is no room in the R representation to store the flag, in-band flag values that indicated different representation must be illegal to write in the R format. If the reduced data that falls on the flag field is a reserved flag value, the packet must be expanded and written uncompressed. Because of this, the flag should be as long as possible to reduce the probability that reduced data will contain the flag value. However, in the B, A, and P encodings, the flag field cannot be used for anything else, and is thus wasted bits; therefore, the flag should be a short as possible. Eight flag bits are used in one embodiment.

In another embodiment, partial coverage layers are handled by disallowing them if more than one full coverage compression method is defined. For example, in 2BRP there are two full coverage compression methods defined, namely B for full reduction and arithmetic compression and R four full reduction. In this case, since P is part of the compression method combination, partial coverage layers would be disallowed for this combination—but the full compression methods themselves are allowed. As another example, compression method combination 2AP is allowed because only one full compression method A (arithmetic compression) as defined in the combination.

In another embodiment, partial coverage layers are allowed when the best compressed full coverage method has been chosen. For example, if best compressed compression methods may be ordered as B, R, A, and C, where B is the best compressed, then in compression method combination 3 BRP, the combinations that may be allocated compression bit states are the following: B, R, BP, BPP, BPPP, BPPPP, BPPPPP.

In another embodiment, partial coverage layers begin after the size of the largest full coverage compression method is used. This may involve reading or writing unneeded sub packets.

Figure 9:
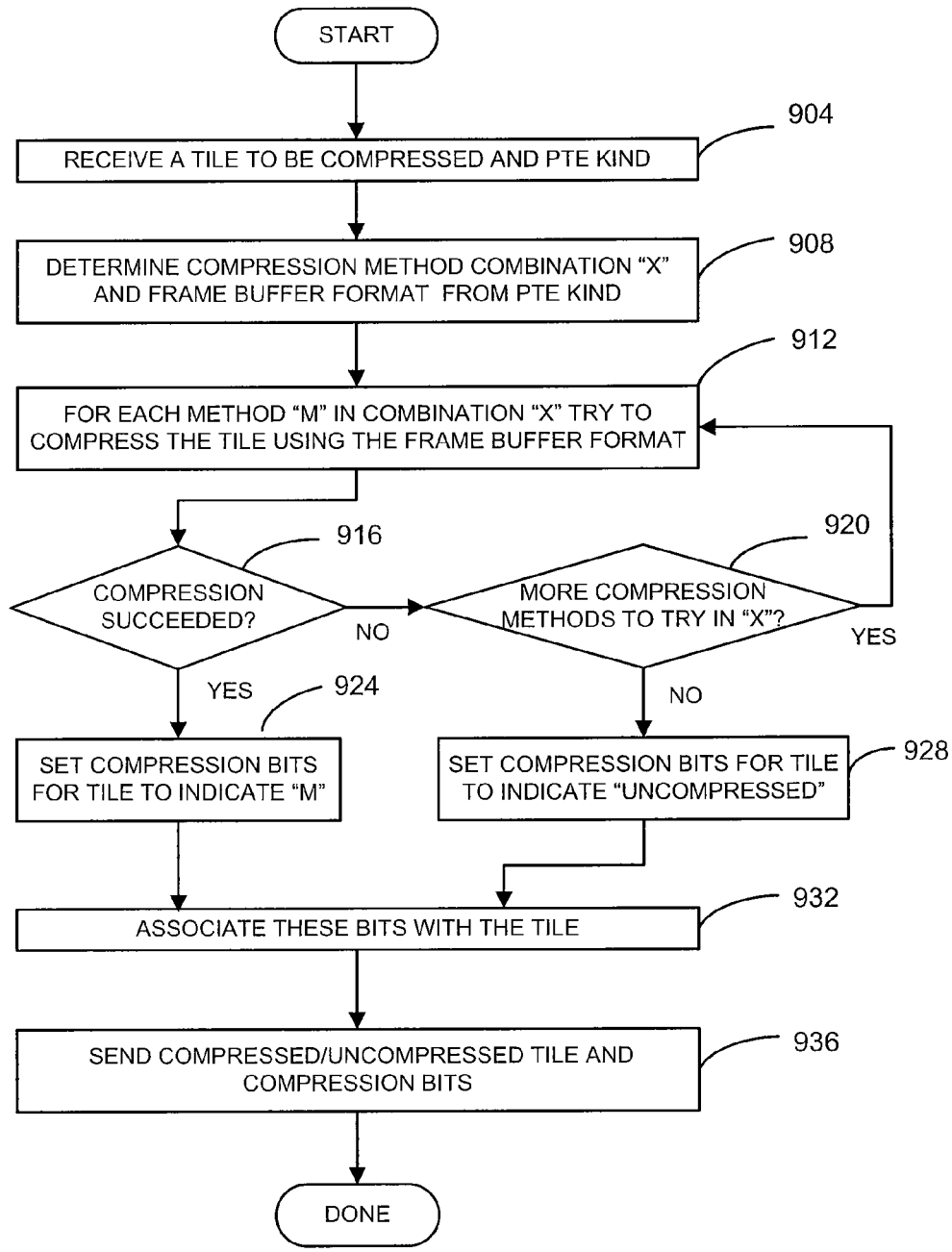
FIG. 9 is a flow diagram of the method steps for using a compression method combination and frame buffer format encoded in the PTE kind bits in a page table entry to compress a tile, according to one embodiment of the present invention.

FIG. 9 is a flow diagram of the method steps for compressing a tile using a pre-determined compression method combination and frame buffer format encoded into the PTE kind bits in a page table entry of that page, in accordance with an embodiment of the present invention. The process begins at step 904 where the system receives a tile to be compressed and the PTE kind associated with the page. Recall that the system has determined the compression method combination and the MSAA frame buffer formats for the surface at the time the surface was allocated; this information was encoded in the PTE kind of the page table entry.

In step 908, the system determines the compression method combination "X" and the associated frame buffer format that corresponds to the PTE kind. Typically, a resource manager in the ROP 360 makes this decision of which compression method combination and the frame buffer format is appropriate. In step 912, the system applies the compression method combination "X" for the tile. A compression method combination typically has the following format:

[#bits for compression] [$M_1 M_2 M_3 \ldots$]

The first part is the number of bits that can be used for encoding the compression method. The second part captures the actual compression method used to compress a tile. It is a sequence of method names drawn from the set {C, B, R, A, P}, where C is zero-bandwidth clear, B is both full reduction and arithmetic compression, R is full reduction, A is arithmetic compression, and P is partial coverage layers. No method name is repeated in the sequence. It specifies the order in which the compression methods will be attempted by the system. It further specifies how each method in the sequence is mapped sequentially to compression bit states starting with bit state 0. The system is also cognizant of the frame buffer format to use while attempting to compress the tile, which is included in a portion of the PTE kind.

Without partial coverage layers, one sequence might be BRA, where the system will first try compression method B (attempting full reduction compression followed by arithmetic compression). If method B succeeds in compressing the tile, then bit state 1 (bits 01) corresponds to method B (recall that bit state 0 is reserved for the uncompressed state). If compression method B fails to compress, the system will try R, which is the full reduction compression method. If R succeeds in compressing the tile, then the corresponding bit state is 2 (bits 10). If method R fails to compress a tile, then the system will attempt the A compression method, which is arithmetic compression. If method A succeeds in compressing the tile, then the state corresponding to method A in the sequence is state 11. Thus, step 916 "iterates" over the sequence of methods in the compression method combination "X" and attempts to apply each one in order using the frame buffer format, keeping track of which bit states correspond to which compression method in the sequence. The system determines whether the compression method "M" that was attempted succeeded in compressing the tile. If method "M" did not succeed in compressing the tile, then the system in step 920 checks to see if there are more compression methods in the sequence to try. If yes, the system returns to step 912 to try the next method "M" in the sequence; if no, then all compression methods that were attempted failed to compress the tile, the tile will remain uncompressed, and the system moves to step 928. If method "M" did succeed in compressing the tile using method "M" then the system moves to step 924.

In step 924, the system determines the compression bits corresponding to the compression method "M" that succeeded in compressing the tile. In one embodiment, these compression bits may correspond to their position in the sequence of methods from compression method combination "X." In other embodiments, there may be no simple correspondence between the compression bits and their position in the sequence of methods. The system moves to step 932.

In step 928, the system set the compression bits for the tile to indicate "uncompressed." In one embodiment, the compression bit state corresponding to an uncompressed tile (that is, no compression method succeeded in compressing the tile from the compression method combination "X") may be 0. The system moves to step 932.

In step 932, the system associates these compression bits with the tile.

In step 936, the system sends the tile—be it compressed or uncompressed—together with the compression bits to the L2 cache. In one embodiment, the system may write these compression bits into a cache line of compression bits associated with the memory page in the L2 cache.

In the embodiments of the invention described above, the compression method combinations and the frame buffer formats are encoded and stored as page table entries. In alternative embodiments of the invention, the compression method combinations and the frame buffer formats may be encoded and stored as header information associated with an image data buffer.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A compression method using compression method combinations and frame buffer formats for image data, the method comprising:
   receiving a first set of pixels included in the image data for a tile, and data specifying a compression method combination and a frame buffer format;
   applying a plurality of compression methods included in the compression method combination using the frame buffer format to the first set of pixels included in the image data for the tile;
   determining that a first compression method included in the plurality of compression methods was successful in compressing the first set of pixels included in the image data for the tile; and
   in response, writing the compressed image data associated with the first compression method for the tile.

2. The method of claim 1, further comprising:
   decoding the data specifying the compression method combination and the frame buffer format.

3. The method of claim 2, wherein the compression method combination and the frame buffer format are encoded as a page table entry corresponding to a page in a frame buffer, and the data specifying the compression method combination and the frame buffer format is retrieved from the page table entry.

4. The method of claim 3, wherein the step of applying the plurality of compression methods included in the compression method combination using the frame buffer format to the first set of pixels included in the image data comprises:
   determining a number of compression bits that are needed to encode a compression method;
   applying the plurality of compression methods included in the compression method combination to the first set of pixels included in the image data in a particular order specified by the compression method combination;
   encoding in the compression bits an indication of a compression method that was chronologically first to succeed in compressing the image data for the tile; and
   associating the compression bits with the image data for the tile.

5. The method of claim 4, wherein the step of encoding the first compression method in the compression bits comprises:
   representing each of the plurality of compression methods included in the compression method combination with a compression bit state that comprises the number of compression bits; and
   encoding the bit state into the compression bits associated with the image data.

6. The method of claim 5, wherein the step of representing each of the plurality of compression methods included in the compression method combination with a compression bit state comprises:
   determining if the method involves partial coverage layers; and
   assigning different compression bit states for each different combination of full compression method and partial coverage layer method.

7. The method of claim 5, wherein the step of representing each of the plurality of compression methods included in the compression method combination with a compression bit state comprises:
   determining if the method involves partial coverage layers; and
   mapping the compression bit states to the number of sub packets in the tile based on an in-band flag value, wherein the tile comprises at least zero or more sub packets.

8. The method of claim 4, wherein the step of determining a number of compression bits comprises:
   extracting a number from the compression method combination, wherein the number is the first component of the compression method combination; and
   interpreting the number as the number of compression bits that are used to encode the compression method and that are associated with the image data.

9. The method of claim 2, wherein the compression method combination and the frame buffer format are encoded in a header associated with an image data buffer and the data specifying the compression method combination and the frame buffer format is retrieved from the header.

10. The method of claim 9, wherein the step of applying the plurality of compression methods included in the compression method combination using the frame buffer format to the first set of pixels included in the image data comprises:
   determining a number of compression bits that are needed to encode a compression method;
   applying the plurality of compression methods included in the compression method combination to the first set of pixels included in the image data in a particular order specified by the compression method combination;

encoding in the compression bits an indication of a compression method that was chronologically first to succeed in compressing the image data for the tile; and associating the compression bits with the image data for the tile.

11. The method of claim 10, wherein the step of encoding the first compression method in the compression bits comprises:

representing each of the plurality of compression methods included in the compression method combination with a compression bit state that comprises the number of compression bits; and encoding the bit state into the compression bits associated with the image data.

12. The method of claim 11, wherein the step of representing each of the plurality of compression methods included in the compression method combination with a compression bit state comprises:

determining if the method involves partial coverage layers; and assigning different compression bit states for each different combination of full compression method and partial coverage layer method.

13. The method of claim 11, wherein the step of representing each of the plurality of compression methods included in the compression method combination with a compression bit state comprises:

determining if the method involves partial coverage layers; and mapping the compression bit states to the number of sub packets in the tile based on an in-band flag value, wherein the tile comprises at least zero or more sub packets.

14. The method of claim 10, wherein the step of determining a number of compression bits comprises:

extracting a number from the compression method combination, wherein the number is the first component of the compression method combination; and interpreting the number as the number of compression bits that are used to encode the compression method and that are associated with the image data.

15. A non-transitory computer-readable storage medium storing instructions that, when executed by a processor, cause the processor to carry out a compression method that includes the steps of:

receiving a first set of pixels included in an image data for a tile and data specifying a compression method combination and a frame buffer format;

applying a plurality of compression methods included in the compression method combination using the frame buffer format to the first set of pixels included in the image data for the tile;

determining that a first compression method included in the plurality of compression methods was successful in compressing the first set of pixels included in the image data for the tile; and in response, writing the compressed image data associated with the first compression method for the tile.

16. The non-transitory computer-readable storage medium of claim 15, wherein the data specifying the compression method combination and the frame buffer format is in encoded form and the instructions, when executed by a processor, cause the processor to carry out a compression method that further includes the step of:

decoding the data specifying the compression method combination and the frame buffer format.

17. The non-transitory computer-readable storage medium of claim 16, wherein the data specifying the compression method combination and the frame buffer format is stored in a page table entry.

18. The non-transitory computer-readable storage medium of claim 16, wherein the data specifying the compression method combination and the frame buffer format is stored in a header associated with an image data buffer.

19. A system for performing a compression method using compression method combinations and frame buffer formats for image data, the system comprising a processor configured to:

receive a first set of pixels included in the image data for a tile and data specifying a compression method combination and a frame buffer format;

apply a plurality of compression methods included in the compression method combination using the frame buffer format to the first set of pixels included in the image data for the tile; determine that a first compression method included in the plurality of compression methods was successful in compressing the first set of pixels included in the image data for the tile; and in response, write the compressed image data associated with the first compression method for the tile.

20. The system of claim 19, wherein the data specifying the compression method combination and the frame buffer format is in encoded form and stored in one of a page table entry and a header associated with an image data buffer.

21. The method of claim 1, wherein the frame buffer format indicates a sample size rate for a buffer used to store compressed data for a page of image data.

22. The method of claim 1, wherein the image data comprises a plurality of pages, wherein each page comprises a plurality of tiles, and further comprising, for each page, receiving data specifying a compression method combination associated with the page and a frame buffer format associated with the page.

* * * * *